US009314738B2

(12) United States Patent
Hoce

(10) Patent No.: US 9,314,738 B2
(45) Date of Patent: Apr. 19, 2016

(54) WET PARTICULATE NEUTRALIZING CANISTER FOR LIQUID ACID VACUUM RECOVERY

(76) Inventor: John Michael Hoce, Gainesville, FL (US)

(*) Notice: Subject to any disclaimer, the term of this patent is extended or adjusted under 35 U.S.C. 154(b) by 1011 days.

(21) Appl. No.: 13/390,186

(22) PCT Filed: Aug. 6, 2010

(86) PCT No.: PCT/US2010/044652
§ 371 (c)(1),
(2), (4) Date: Mar. 12, 2012

(87) PCT Pub. No.: WO2011/022223
PCT Pub. Date: Feb. 24, 2011

(65) Prior Publication Data
US 2012/0156117 A1 Jun. 21, 2012

Related U.S. Application Data

(60) Provisional application No. 61/235,246, filed on Aug. 19, 2009.

(51) Int. Cl.
*B01D 53/40* (2006.01)
*B01D 53/80* (2006.01)
(52) U.S. Cl.
CPC ............... *B01D 53/40* (2013.01); *B01D 53/80* (2013.01); *B01D 2251/302* (2013.01); *B01D 2251/304* (2013.01); *B01D 2251/604* (2013.01)

(58) Field of Classification Search
CPC ........ B01D 53/40; B01D 53/80; B01D 53/78; B01D 47/021
USPC ......... 422/168, 176, 177, 239, 231, 120, 122; 261/121.1; 96/279
See application file for complete search history.

(56) References Cited

U.S. PATENT DOCUMENTS

| 2,677,601 | A | * | 5/1954 | Ruth ........................... 261/121.1 |
| 3,969,482 | A | * | 7/1976 | Teller ............................... 96/373 |
| 4,432,777 | A | * | 2/1984 | Postma ................ B01D 47/021 261/122.1 |
| 5,415,684 | A | | 5/1995 | Anderson |
| 5,686,053 | A | | 11/1997 | Kikkawa et al. |
| 5,779,999 | A | | 7/1998 | Laslo |

* cited by examiner

*Primary Examiner* — Jill Warden
*Assistant Examiner* — Joye L. Woodard
(74) *Attorney, Agent, or Firm* — Sven W. Hanson

(57) ABSTRACT

Devices and methods are provided for vacuum recovery of hazardous acidic liquids. A novel neutralizing canister (100) passes liquid recovery air through a bed of a combination of solid neutralizing particles (30) and water. The velocity of the air is sufficient to lift the water from the bed and highly agitate and aerate the water. At the same time, the water is allowed to circulate through the neutralizing particles (30) to maintain a high pH. This action increases the effectiveness of the neutralizing particles (30) such that the air leaving the canister (100) is entirely neutralized and harmless to persons and equipment.

5 Claims, 4 Drawing Sheets

WET PARTICULATE NEUTRALIZING CANISTER FOR LIQUID ACID VACUUM RECOVERY

CROSS-REFERENCE TO RELATED APPLICATIONS

Priority is claimed from expired International Application, Number PCT/US2010/044652 filed Aug. 6, 2010, claiming priority from expired U.S. Provisional Application, No. 61/235,246 filed Aug. 18, 2009.

BACKGROUND OF THE INVENTION

The present invention pertains to vacuum systems for recovering hazardous liquid acid spills. A critical element of the invention is the neutralization of vapors from acid liquids being vacuum-transported such that the vapors may pass through a vacuum pump and into the surrounding ambient air without risk or damage to the pump or nearby humans.

Liquid acid spills pose particular difficulties among the great variety of hazardous waste problems. Conventionally, liquid acid spills are most typically neutralized after or during recovery. This process itself is problematic due to the potential generation of both hydrogen gas and heat from what is an exothermic event. As well, the result of neutralization is an increased volume of waste requiring disposal. However, recovery of un-neutralized acid liquid spills is difficult and may be dangerous due to the nature of acids.

Various vacuum systems with the potential for use in recovery of liquid acid spills are known and available. However, an inherent element of vacuum systems for this use is the movement and mixing of surrounding air with the transferred liquid. This is particularly true where a spill is relatively uncontained on a surface such as the ground and therefore has a low depth. To draw such a spill into a vacuum system requires a large volume of entraining transport air. This relatively large volume of air must pass through the vacuum pump and be exhausted in some manner into the ambient air. Prior vacuum recovery systems are not safe for use with recovery of acid liquids because the associated entraining air volume itself becomes a hazard due to the entrained acid liquid vapors. Because, these liquid vapors are acidic, they may degrade or destroy the pump equipment. As well, when exhausted into an occupied space, they may pose a hazard to both surrounding equipment and persons.

A large portion of acid liquid spills, and other situations requiring transfer of acid liquids, involve relatively small volumes of liquid. In addition, these events often occur in circumstances where the location is not planned or controlled, such as accidental spills in industrial facilities. In these circumstances, it is desirable to have available a portable recovery device and methods that are operable by a minimum of personnel, with a minimum of training and instruction, and with readily available power. What is needed is a simple, vacuum recovery system for acid liquids that may be used without degrading the surrounding air and is applicable for low capacity systems.

SUMMARY OF THE INVENTION

The invention provides a solution to the problems involved in vacuum recovery of liquid acid spills. The present invention includes devices and methods enabling vacuum recovery of acid liquids while neutralizing all entrained air to protect vacuum equipment and the surrounding persons from exposure to acid vapors. In particular, the invention includes a neutralizing canister or like container containing a quantity of neutralizing solid particles. In use, addition of water to the neutralizing solid provides a neutralizing combination of water and solid particles through which acid vapors may be passed to effectively neutralize the acidic content. The canister internal volume is significantly greater than the volume of the combined neutralizing particles and water contained such that the water may be highly agitated by, and mixed with, the air stream passing through the canister. This construction and action provides a marked increase in neutralizing effect over prior art devices and methods.

In preferred embodiments, the invention provides a portable neutralizing canister that may be used with conventional vacuum systems to safely recover acid liquids without damage to the vacuum system. The canister significantly improves the capacity and effectiveness of solid particulate neutralizing agents by combining the solid agent with water.

The invention includes methods of neutralizing acidic vapors entrained in a vacuum system by passing the vapors at high speed through a mixture of water and solid particulate neutralizing agent.

The invention also includes improved hazardous liquid recovery systems including a vacuum pump and recovery reservoir and acid vapor neutralizing canister according to the invention connected between the reservoir and the pump.

An advantage of the invention is a portable liquid acid spill vacuum recovery system that may be exhausted into inhabited spaces without detrimentally affecting the ambient air.

Other characteristics and embodiments of the invention are provided in the detailed description and claims that follow.

DESCRIPTION OF THE DRAWINGS

FIG. 2b depicts the displacement of liquid in the canister during use.

DESCRIPTION OF EMBODIMENTS

Figure 1:
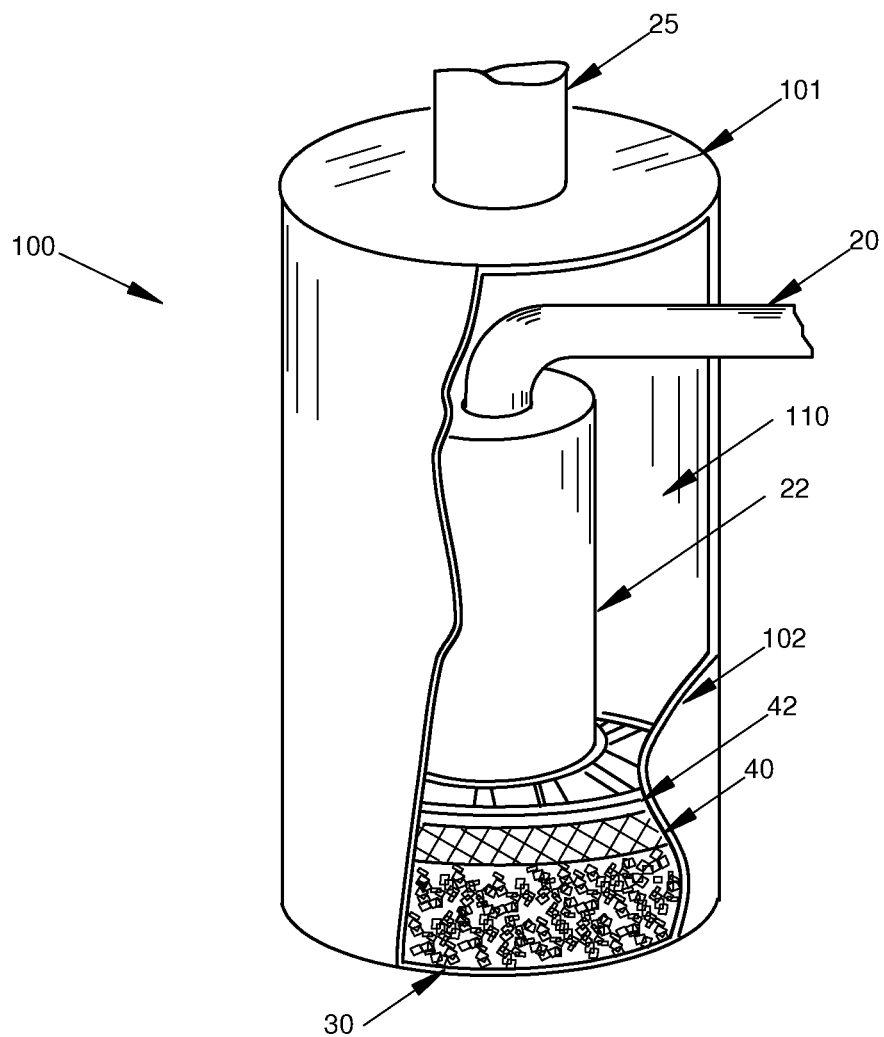
FIG. 1 is a perspective illustration of one embodiment of a neutralizing canister according to the invention.
Figure 2A:
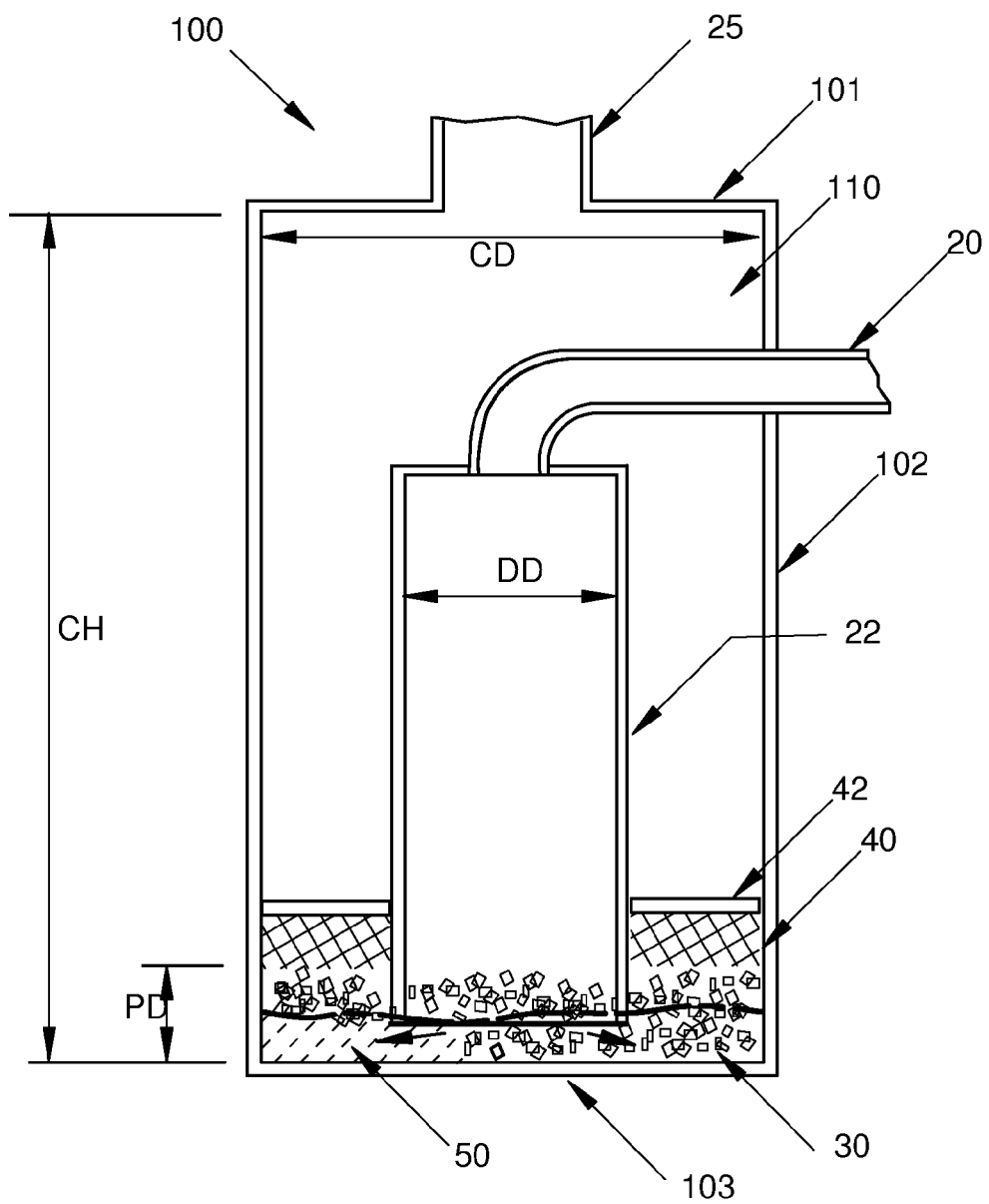
FIGS. 2a and 2b are side cross section illustrations of the embodiment of FIG. 1.
Figure 2B:
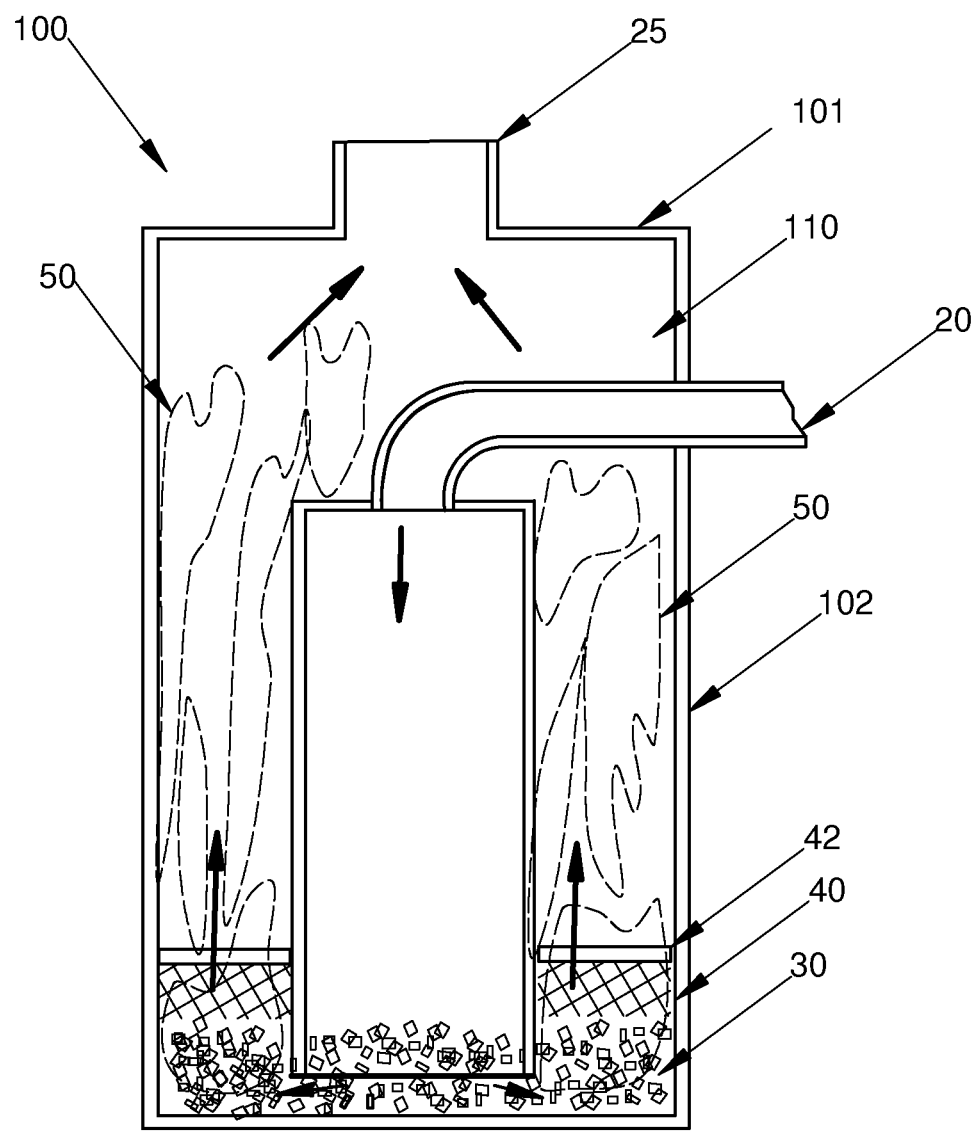

FIGS. 1, 2a and 2b each depict a preferred embodiment of the invention. FIG. 1 illustrates an inventive canister 100 that is cylindrical and hollow. Alternative shapes are possible but must satisfy the functional requirements discussed below. The canister 100 has a top 101 and opposing bottom 103 with a connecting and enclosing vertical side wall 102. The side wall 102 of the canister 100 is partially cutaway in the FIG. 1 for visibility.

An inlet conduit is provided for allowing air to be drawn into the canister 100. In this embodiment, the inlet conduit takes the form of a rigid inlet tube 20 which enters the canister 100 through a penetration in the canister side wall 102. The inlet tube 20 joins and communicates with a rigid down tube 22 within the canister 100. The down tube 22 is rigidly fixed in a position concentric with the canister 100. The down tube 22 has an open bottom end 23 located just above, and separated from, the bottom 103, such that air may freely pass through the down tube 23 and through its bottom end 23 into the canister 100.

A canister outlet 25 is located in the center of, and is connected to, the top 101 and is configured to allow air to be drawn from within the canister 100. In this embodiment, the outlet 25 is a rigid tube. Both the inlet tube 20 and outlet 25 may take any of a variety of forms and, for convenience, may also include any of various releaseable connections such as are used in the prior art for similar purposes. The size and shape of the inlet tube 20 and outlet 25 are determined dependent primarily on their ability to freely convey air to and from the canister. The inlet tube 20 outside diameter should be as small as practicable within the canister 100 to reduce its effect on airflow within the canister 100.

Inside the canister 100, and against the bottom 103, is located a quantity of neutralizing particles 30 that are evenly distributed over the bottom 103 to a generally even depth PD. The particles 30 in the figures are not to scale and are shown, for clarity, with relatively greater spacing between particles than actually occurs.

Above the particles 30 is located a porous retainer 40 which tightly fits against the outer wall of the down tube 22 and against the inside of the sidewall 102. The function of the retainer 40 is to retain the particles 30 in a tightly packed state against the bottom 103. The retainer 40 may, in alternative embodiments, be secured to the down tube 22 and sidewall 102. The retainer 40 is located vertically to tightly compact the particles 30 against the bottom 103. The retainer 40 is preferably formed of a flexible open mesh inert material that offers little resistance to air passage, yet has small enough openings or pores to ensure that the particles 30 are retained in place. Alternatively, the retainer may take the form of one or more rigid screens or baffles with openings sufficient for air flow yet small enough to retain the particles 30 in the same manner as the open mesh material. In the embodiment illustrated in the figures, an open frame rigid spider 42 is provided above the retainer 40 to provide additional structural support. The spider 42 is attached to or integrated into the sidewall 102 and down tube 22 to provide the necessary security. The spider 42 should be substantially open to vertical air passage. Where a rigid retainer 40 is used, a spider 42 may be unnecessary.

The embodiment shown in FIG. 1 illustrates an inventive canister 100 as it may be constructed and stored prior to distribution for use. No water has yet been introduced into the canister 100.

In FIG. 2a, the same embodiment is illustrated wherein a quantity of water 50 has been added to the canister 100. In the figure, a portion of the particles 30 are not shown to enable illustration of the water 50. The canister's nominal vertical internal height CH, from the bottom 103 to the top 101, is large enough that an empty cavity 110 is provided above the water 50. Before use, this volume contains air or an introduced inert gas. The openings in the spider 42 and retainer 40 allow the water to fill the spaces or voids between and surrounding the particles 30. FIG. 2a illustrates the inventive canister in condition ready to be used as intended.

Once the water is added to the canister and contacts the neutralizing particles 30, the water takes on or accepts a portion of the neutralizing capacity of the solid particles 30.

FIG. 2b illustrates the same embodiment while in use neutralizing through-flowing air that contains acidic vapors. The air passes from the inlet tube 20 and down tube 22 and into the neutralizing particles 30. The particles are held in place such that the air must pass through the spaces between and around the neutralizing particles. In so doing, the water 50 is partially lifted out of the neutralizing particles 30 by the air, and is highly agitated and suspended in rapidly moving drops, curtains, and columns of water within the canister empty cavity 110 above the particles 30. The water does not become a suspended mist, but, different portions at a time, runs back into particles by the force of gravity.

This agitation and lifting of the water are believed to have two significant effects. The first is a greatly increased contact time of the acidic vapors with potentially neutralizing matter. The second is rapid mixing of the water within the volume of particles. This second assures that the water retains an effectively high pH while neutralizing the passing air stream.

In order to enable the above described lifting and agitation of the water within the canister, it is essential that the air flow rate is sufficiently high enough through the neutralizing particles and through the canister. This requires that the canister and downtube geometry be designed to match specific air flow rates. An acceptable design will provide for an upward air velocity of 250 ft/minute (1.25 meters/second), above the particles 30 and retainer 40, and between the canister sidewall 102 and downtube 22. Air velocities significantly below this speed, and that do not lift water from the particles, would be ineffective. Merely bubbling of the air through undisplaced water will not have the desired effect. Higher velocities that prevent water from flowing back into the particles, will be less effective. Likewise, high velocities that might carry water out of the canister are also to be avoided.

For greatest effectiveness and efficiency, the downtube 22 and depth of particles PD must be selected to ensure that air passing from the downtube 22 and into the particles 30 is distributed through the volume of particles 30. For this reason, the downtube nominal diameter DD is preferably approximately one-half the canister inside diameter CD. If the downtube diameter is too small, relative to the canister, air will be induced to "shortcut" to the surface and will not be force outward toward the sidewalls 102. For the same reason, the particle depth PD should be, preferably at least 75 percent of the canister inside diameter CD. As well, the downtube lower end 23 should be as close as possible to the canister bottom without choking the air flow. In alternative configurations of a canister 100 according to the invention, internal structures may be included to induce more even distribution of air through the volume of neutralizing particles 30.

Because, during operation, the water is lifted above the neutralizing particles 30 and, for a while, carried with the flowing air, the canister height CH must be sufficient to ensure that the water is not carried out of the canister 100 by the air. While baffling or other devices might be used to reduce this problem by mechanically separating the water, sufficient canister height and volume are also necessary to provide effective contact time of air and water to enable complete neutralization of the air. For these reasons, the canister height should be at least six times the particle depth PD. This requirement may also be defined by a total canister inside volume at least six times the compacted volume of the particles. Herein, the volume of the particles is considered to include the volume of the inter-particles spaces.

Because the water provides a substantial neutralizing effect, it must be maintained with a high pH. The water's high pH during operation, while the water is being aerated, is dependent on continuing contact with the particles. For this reason, the volume of water 50 must not be too great as compared to that of the neutralizing particles 30. If the water volume is too large, as the water neutralizes vapor and the water itself is reduced in pH, the quantity of neutralizing particles 30 will be insufficient to maintain neutralizing capacity of the water. A volume of water that is one half that of the bulk neutralizing particles (including inter-particle space) has been found effective.

Figure 3:
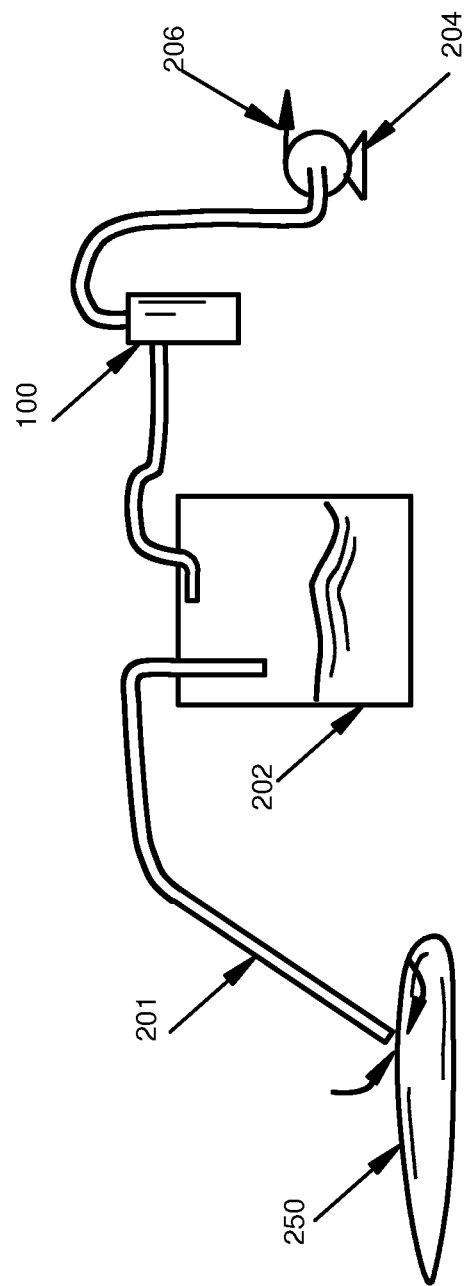
FIG. 3 is a schematic illustration of one application of the invention in acid liquid spill recovery.

FIG. 3 illustrates a novel vacuum recovery system incorporating a neutralizing canister according to the invention. In the illustrated application of the system, a vacuum hose pickup 201 is located above or on the surface of a liquid acid spill 250. The pickup 201 is connected to a vacuum liquid recovery vessel 202. The outlet of the vessel 202 is connected to a neutralizing canister 100 according to the above description. The canister outlet is connected to a vacuum pump 204.

In operation, the vacuum pump 204 draws air through the system shown such that ambient air is drawn into the pickup 201 along with the liquid spill 250. The liquid portion is separated out and stored within the vessel 202, consistent with some prior vacuum recovery methods.

Inevitably, the entraining air is mixed with, vaporizes, and acquires a portion of the acidic liquid recovered. After removal of the liquid, the vapor filled air is then neutralized as discussed above as it passes through the canister 100. The neutralized air then passes through the vacuum pump 204 without damage or acidic deterioration to the pump components. The exhaust air 206 has a neutral pH and is harmless to humans and any surrounding incidental equipment.

In alternative configurations, the canister 100 may be integrated into other components such as within a vacuum drum configured to accept acids. Similarly, the benefit and function of the neutralizing canister 100 may be gained in use with other vacuum recovery systems.

To test the effectiveness of the inventive canister and methods, a prototype canister was built essentially following the description above. Construction made use of conventional polyvinyl chloride (PVC) plastic pipe and fittings as are typically used for water service plumbing. The canister sidewall 102 was formed of clear acrylic plastic to enable observing the operation within the canister 100.

The prototype canister has an internal height CH of approximately 18 inches (0.5 meters) and internal diameter of 6 inches (15 centimeters). However, the PVC endcap used to form the bottom provides an internally concave shaped bottom increasing somewhat the effective height and volume of the prototype canister 100. The downtube 22 has a diameter of approximately 3 inches (7.6 centimeters). A quantity of 64 (sixty four) volume ounces (1.89 liters) of neutralizing agent particles (SODASORB™ as described below) was placed in the bottom of the canister 100. This provided a neutralizing particle depth PD of approximate 4.5 inches (11.43 centimeters) above the lower end of the sidewall 102. The downtube 22 is positioned with its lower end 23 level with the bottom of the canister sidewall 102, that is, 4.5 inches (11.43 centimeters) below the top of the particles 30. A retainer 40 is provided from an open mesh industrial cleaning pad material of inert non-metallic construction. An open frame rigid spider 42 attached to the downtube 22 secures the retainer 40 in place.

Before operation, 32 volume ounces (0.95 liters) of water was added to the canister and allowed to flow into the neutralizing particles 30 at the bottom. The canister was connected to a vacuum system between a recovery drum and vacuum pump in the manner illustrated in FIG. 3. The pump exhaust was directed into a clear container filled with gaseous ammonium hydroxide.

It is well known that under these conditions, any unneutralized acid vapor contents in the exhaust will produce an immediate visible clouding of the gaseous contents of the container as the acidic vapor reacts with the ammonium hydroxide.

A test "spill" was created by depositing 30 gallons (113.6 liters) of 31 percent muriatic acid onto a horizontal surface and allowing it to disburse to a depth in a range of approximately 0.5 to 4 inches (1.27 to 10.1 centimeters).

The prototype test system was operated to recover the muriatic acid using a vacuum air flow rate of 35 cubic feet per minute (16.5 liters per second). Recovery required approximately five minutes with a ratio of recovered air to liquid of approximately of 50 to 1. No clouding of the ammonium hydroxide was discernable throughout the operation. It was concluded that the acid content of the exhaust air, after neutralization, was below detectable levels.

In the prototype canister, the bottom is removable to allow for the neutralizing particles to be added to the canister. The canister is temporarily upturned for this action. A second disk-shaped section of retainer material is preferably located and secured within the downtube to provide a barrier to particles dropping into the upturned downtube. It is formed from the same material as the retainer described above. This retainer section also ensures tight packing of the particles during use.

In the discussion and prototype operation above, liquid acid is recovered by an entraining air stream. However, in some applications it is possible to recover liquid by relatively positive displacement, that is lifting a column of liquid without air. Although no or little entraining air is present, vacuum exhaust air is typically still acidic without neutralization. This is due to the mixing and partial vaporization of the recovered acid liquid with the incidental air or gases present in the liquid storage container. The present invention is similarly applicable in such circumstances.

Herein, the term "air" is used when referring to the entraining gas material being transported through the system. However, other gaseous materials including inert gases introduced for other safety reasons are intended and should be understood to be "air" is used and intended in the scope of the invention. Although in many applications, "air" will consist of ambient air, the operation, use and benefits of the invention are not limited by ambient air as the transport or entraining medium to be neutralized.

The same concepts and general design of the invention may be scaled to larger units providing greater flow rates and larger total capacity. In various alternative configurations, the vacuum pump may be any of a variety of electric motor or internal combustion engine driven vacuum pumps, or equivalent devices, capable of the vacuum head and flow rate required for a specific collection. In the embodiments discussed and in all applications, known vacuum pumps are contemplated. As well, future devices for providing equivalent performance may be incorporated.

Selection of the neutralizing agent is important in most applications both with respect to particle size and composition. Particle size determines available surface area, and therefore potential absorption rates, as well as pressure drop. Particle shape also affects packing and therefore velocity, mixing and pressure drop. An effective solid agent for neutralizing vapors of acid liquids is a pelletized form of a mixture hydrated lime and sodium hydroxide. A preferred agent is defined by the example provided by any of the products sold by the W.R. Grace & Company corporation (U.S.A) under the product name of SODASORB™ having a composition of 1 to 10 percent potassium hydroxide, 1 to 10 percent sodium hydroxide, and at least 50 percent calcium hydroxide, by weight. This product is provided in pellet or irregular granules of sizes in the range of two to five millimeters, any of which are applicable in the inventive devices and methods. However, other particle acid neutralizing materials and solid form may be used in the inventive methods where the used of highly agitated water will increase the effectiveness of the neutralizing agent.

Water is used in the invention for its fluid mechanical properties and it ability to take on the neutralizing capacity of the neutralizing particles. Other liquids or mixtures of water and other liquids or solutes may be used if they provide the same properties. For example, a prepared basic (high pH)

water solution may be used. However, the characteristics of the liquid must be compatible with the neutralizing particles.

For commercially useful devices, the inventive canister 100 and all associated parts and fitting potentially exposed to the processed air, the neutralizing particles 30 or water 50 should be formed of corrosion resistant materials. Acceptable materials include conventional industrial plastics used for similar purposes.

Herein the verb "neutralize" and forms thereof, are used to indicate removal of acidic constituents from a gas or vapor stream, or chemical alteration of the constituents of a gas or vapor stream, to establish generally a pH neutral characteristic in the material of interest. Likewise, a neutralizing agent or neutralizing particles is an agent or particle having the capacity to neutralize acids.

The preceding discussion is provided for example only. Other variations of the claimed inventive concepts will be obvious to those skilled in the art. Adaptation or incorporation of known alternative devices and materials, present and future is also contemplated.

The invention claimed is:

1. A device for neutralizing acidic vapors in a gas stream comprising:
   a hollow canister having an outlet for gas;
   a volume of acid-neutralizing particles retained in a packed configuration within the canister and including a quantity of liquid disposed within the canister and intermixed with the particles;
   a conduit for directing a gas stream into the canister and into the volume of acid-neutralizing particles and liquid;
   the canister also comprising:
   a cavity located above the particles, and
   a retainer extending over the volume of acid-neutralizing particles and configured to prevent upward movement of the particles while allowing passage of gas and liquid upward through the retainer and into the cavity;
   such that a gas stream directed through the conduit with sufficient velocity will pass through the particles and at least partially lift the liquid within the volume of acid-neutralizing particles into the cavity before separating from the gas and falling back into the volume of acid-neutralizing particles, whereby acidic vapors in the gas stream are neutralized before the gas stream leaves through the outlet.

2. A device according to claim 1, and wherein:
   the canister cavity has a volume at least five times the volume of the particles.

3. A device according to claim 2, and wherein:
   the particles comprise potassium hydroxide, sodium hydroxide, and calcium hydroxide.

4. A device according to claim 1, and wherein:
   the particles have an average diameter in the range of two to five millimeters.

5. A device according to claim 1, and wherein:
   the canister has a round cross-section and the conduit comprises a rigid tube located concentrically within the canister.

* * * * *